Oct. 22, 1935.   R. A. BROOKS   2,017,840
FLUSHING VALVE
Filed Aug. 18, 1930   2 Sheets-Sheet 2
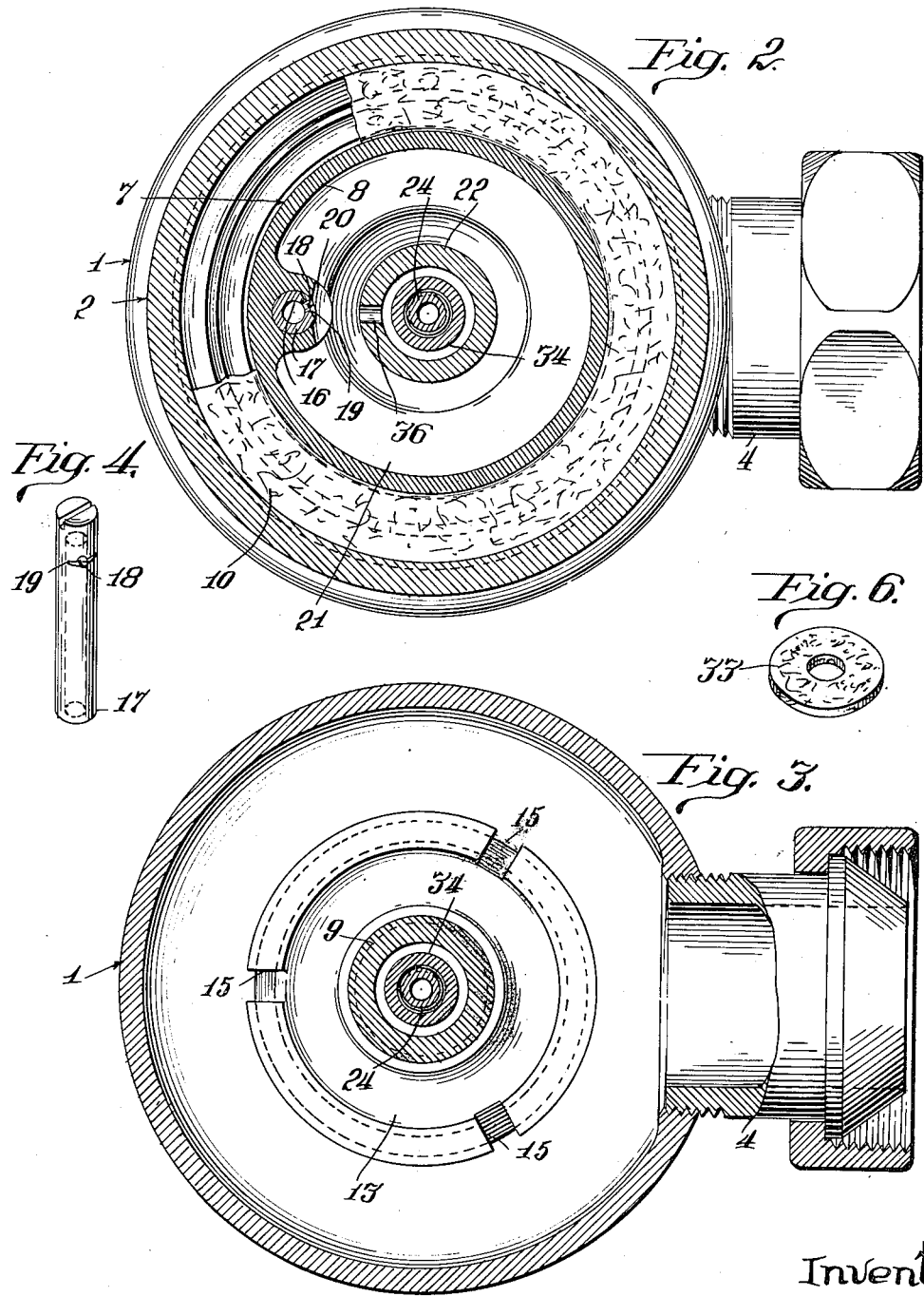
Inventor
Robert A. Brooks Patented Oct. 22, 1935

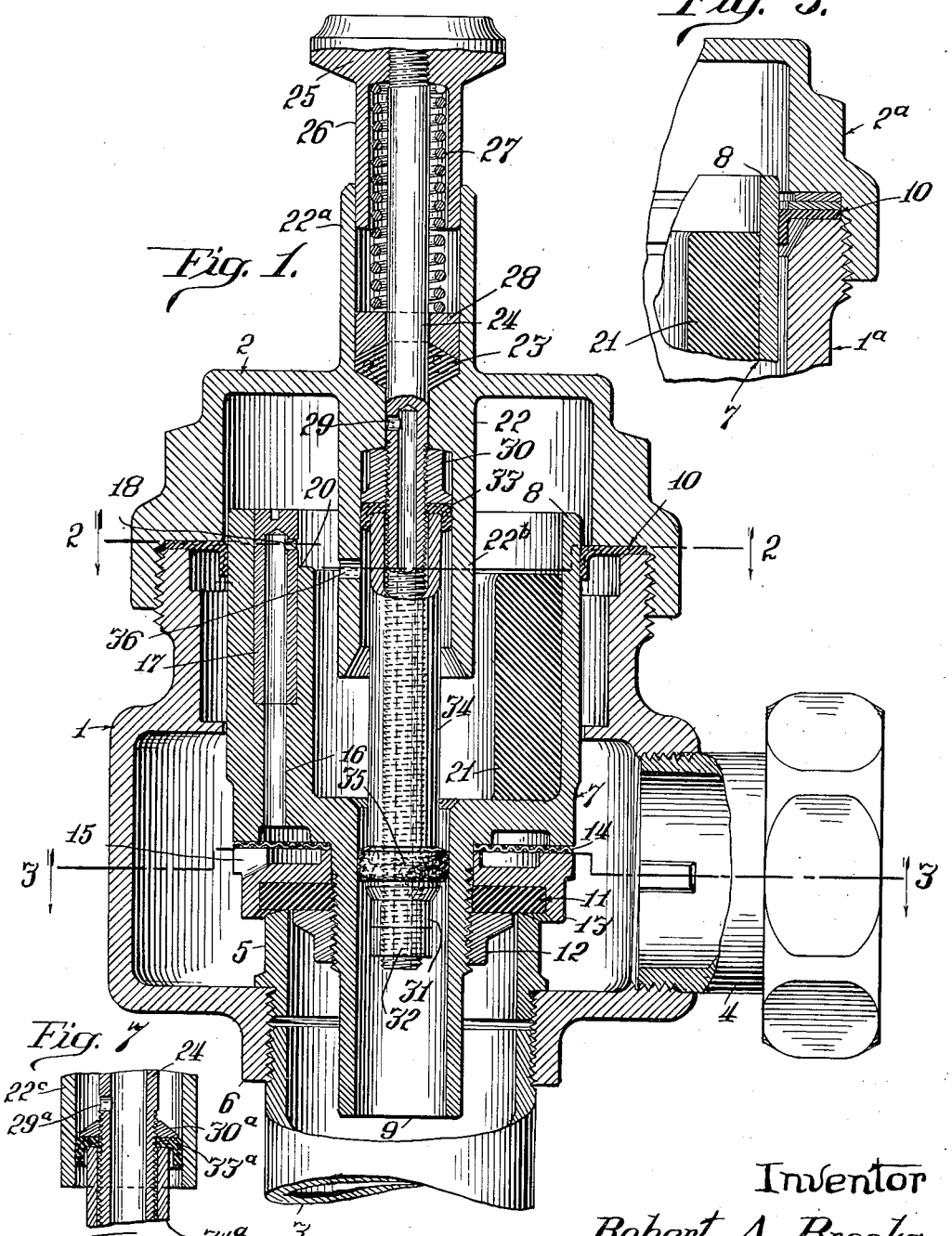

2,017,840

UNITED STATES PATENT OFFICE 2,017,840

FLUSHING VALVE

Robert A. Brooks, Chicago, Ill.

Application August 18, 1930, Serial No. 476,028

15 Claims. (Cl. 137—93)

My present invention relates to improvements in a certain type of slow closing flushing valves in general use for the purpose of causing the flow of a regulated volume of water to flush out the closet bowls of water closets. In the type of valves in question the main valve is connected to a piston working in a cylindrical pressure chamber which communicates through an adjustable by-pass of limited capacity with the source of water under pressure and which, through actuation of a manually operable relief valve may be placed in communication also with the outlet passage of the device, so that when the relief valve is actuated the pressure of the water in the pressure chamber above the piston will be relieved, and the water pressure below, acting on the lower annular surfaces of the connected piston and main valve members outside of the main valve seat, will lift the connected parts and open the main valve.

In part, the present application is a continuation of my earlier application, Serial No. 216,792, filed September 1, 1927, now Patent No. 1,868,520.

In valves of this character the volume of water passing through the regulating port is so small that even the most minute leak past the relief valve will drain the water from the regulating chamber faster than it can enter, with the result that water pressure cannot build up and generate pressure to seat the main valve properly. As such valves are ordinarily constructed, one or both members of the relief valve are constructed of metal, and if the valve does not seat truly, or if an obstruction lodges in the relief valve seat, the main valve will not close and water continues to flow through it. Relief valves and valve seats of the type universally employed, in which a disk valve by axial movement directly opens and closes a circular valve opening, are in nearly all cases the cause of valves not closing. Fine sedimentary deposits, sand, the rotation of the relief valve with respect to its seat causing change of position and faulty seating, uneven valve disks, gummy disks, shrunken or swollen disks,—any one may cause a relief valve of the type mentioned, and in consequence the main valve also, to fail to seat, and cause water to flow continually through the main valve. Any leak past the relief valve which is as great in volume as the volume of water entering through the regulating by-pass,—and this flow is in most cases not as much as will pass through a fine needle hole,—will cause a flushing valve to run continuously. The main object of my present invention is to provide a relief valve so constructed and arranged that it will be free, to the greatest extent possible, from the defects and sources of trouble incident to relief valves heretofore used in such flushing valves, and incidental to this to effect a further improvement conducive to a perfect functioning of the valve in the method of packing the piston in the piston chamber. With the purpose of attaining the objects and advantages mentioned I have designed and invented my novel and improved flushing valve as hereinafter described in detail, the essential elements of my invention being more particularly pointed out in the appended claims.

In the drawings, Figure 1 is a central vertical section of my novel flushing valve;

Fig. 2 is a horizontal section in planes indicated by the broken dotted line 2—2 of Fig. 1;

Fig. 3 is a horizontal section in a plane indicated by the dotted line 3—3 of Fig. 1;

Fig. 4 is a detail of an orificed plug by which the regulating by-pass is adjusted;

Fig. 5 is a fragmentary detail showing a slightly modified construction of the parts through which the packing of the joint between the piston and the wall of the pressure chamber is effected;

Fig. 6 is a perspective of one of the flexible washers which are cupped or flanged to form the valve and packing members of the relief valve assembly; and Fig. 7 is a fragmentary diametrical section of a modified construction of the relief valve and relief valve seat members of the device.

Like reference characters indicate like parts in all figures of the drawings.

The casing of my improved flushing valve may conveniently consist, as illustrated, of a body member 1 and a cap member 2 having a screw-threaded connection therewith, the body being so constructed as to be adapted to be secured to the inlet pipe 4 and outlet pipe 3. The main valve seat is in the present instance formed upon a ring 5, screw-threaded at its base for connection with the internally screw-threaded boss 6 which forms the connection with the outlet pipe.

The hydraulic plunger or piston 7 of my novel valve is a cup-shaped member having an upwardly extending skirt 8 and a hollow axial connecting sleeve or stem 9. The cylindrical outer face of the skirt of the piston is packed by a leather washer 10 having an annular radially extending section which is clamped between the flat, annular, horizontal face at the top of the body member 1 of the valve, and an internal, horizontal annular face at the base (top) of the screw-threaded flange of the cap member 2. The annular clamping face of the cap member overhangs the clamping face on the base member of the valve, and the washer 10 (which before assembly of the parts may be an ordinary flat leather washer) is bent or turned downwardly in a flange hugging the face of the piston in the right-angled circular space at the circular offset between the cap and body members. The annular flat lower face of the cap above the correspondingly shaped radially extending section of the washer forms a backing which effectively supports the washer against the pressure of the water beneath it, while the extended free space below the washer and back of its flange, whether in the counterbored form of the cylinder wall shown in Fig. 1 or the beveled form shown in Fig. 5, permits the water pressure to act most efficiently in forcing the skirt against the face of the piston, and provides for maximum flexibility of the washer during the movement of the piston from upper position (after a flushing operation of the valves, as hereinafter explained) to the lower seated position shown in Fig. 1. This construction has been found to afford a particularly effective and satisfactory packing between the piston and the wall formed by the casing members.

A modified construction of packing for sealing the joint between the plunger and cylinder wall is illustrated in Fig. 5, in which the internal faces of the body member 1a and cap member 2a are in alignment, and the body member is internally chamfered or beveled adjacent the joint between the two members, to enable the washer 10 to be turned downwardly into the space so provided.

The main valve 11 of my flushing device is a washer of leather, or suitable similar material, clamped between a backing nut 12 screwed upon a threaded portion of plunger stem 9 and an annular washer holder 13 above the washer 11, recessed to provide an annular socket for holding it. The top of the washer holder is also formed with an annular recess which lies opposite an annular recess formed in the bottom of the piston member 7 and between the annular walls which define the recesses in the washer holder and piston is interposed a screen member 14 which preferably is formed of nickel wire to avoid undue corrosion. The screen forms in effect a partition in a screen chamber formed by the annular recesses in the washer holder and piston, and below the screen the chamber is in communication, through a port 15, with the space in the valve chamber surrounding the main valve.

The space above the screen 14 is in communication with the cylinder space above the cup-shaped piston through a vertical channel 16 formed in the piston body and in a plug 17 which has a snug frictional fit in a counterbored seat in the upper part of the piston body. As seen in Figs. 2 and 4 this plug is formed with a small radial opening 18 between the channel 16 and its outer face and with a transverse external notch 19 extending circumferentially of the plug for a short distance on each side of the outer end of the opening 18. Opposite this notch the wall of the socket or seat is cut away on the inside, as indicated by the reference character 20, and by means of a screw-slot in the upper end of the plug it may be turned to vary the capacity of the by-pass thus provided.

The piston is made of sufficient weight to seat by gravity, either by means of a separate weight 21 fitting within the piston body, as shown, or by making the piston body itself of a sufficiently massive construction.

The construction and arrangement of the relief valve, a composite structure or assembly of parts which constitute the principal novel feature of my invention, may now be described. The cap member 2 of the valve casing is formed with a vertical axial sleeve 22, having an upper portion 22a and a lower valve chamber portion 22b, between which portions is interposed a packing gland 23 surrounding an operating stem 24 which carries the relief valve assembly. The top of the stem is equipped with a push button 25 having a tubular base 26 telescopically engaging the upper portion 22a of the sleeve and arranged to house a spring 27 interposed between the button member and a follower 28 which forms a part of the gland for the purpose of tensioning the stem and connected relief valve to upper closed position.

The lower end of the operating stem 24 is hollow, and near the upper end of the bore in the stem the latter is formed with a lateral opening or outlet port 29 which, in open lower position of the valve, is arranged to place the space in the pressure chamber above the piston in communication with the outlet passage of the device, as hereinafter explained. A short distance below the smooth cylindrical portion of the stem which slidingly engages the bore surrounding it at the base of the gland 23, the stem is exteriorly threaded to receive an upper backing nut 30 and a lower nut 31 and lock nut 32. Below the nut 30 and clamped between such nut and the lower backing nut 31 are arranged a downwardly flanged leather washer 33 which is disposed adjacent the nut 30 within the valve chamber sleeve portion 22b and constitutes the relief valve member; a tubular spacing sleeve 34 bearing at its top against the central portion of the washer 33; and an upwardly flanged flexible leather washer 35 underneath said sleeve and forming a packing and valve member working in the cylindrical bore of the connecting sleeve 9 of the piston and sealing communication around the assembled parts through said sleeve.

The valve member 33, it will be observed, works in the cylindrical relief valve chamber formed by the inner face of the portion of the sleeve 22a extending downwardly inside the pressure chamber from the cap member 2 of the casing below the gland 23, and this cylindrical portion of the casing wall forming the valve chamber is formed with a port 36 which lies below the valve member 33 when the latter is in upper, normal closed position, while when the relief valve assembly is shifted downwardly to open or relief position the space above the piston is in communication with the outlet passage through the ports 36 and 29, the annular space around the valve stem and associated parts between such ports, and the interior of the relief valve stem.

In Fig. 7 I have illustrated a modified construction of the relief valve and valve seat members differing slightly from that above described in structure but having the same mode of operation. In this modified construction the downwardly flanged leather washer member 33a, confined between the spacing sleeve 34a and backing nut 30a on the hollow operating stem 24 is arranged on such stem so that in normal upper position of the valve it will slidingly engage the relief valve chamber in the sleeve portion 22c of the casing, while in lower position it will clear the lower end of said sleeve and open communication between the retarding chamber and the interior of the hollow stem through a port 29ª in said stem above the valve member and its backing nut 30ª. It will be noted that the latter is formed with an inclined face, and the lower end of the sleeve 22ᶜ is slightly rounded on the inside, in addition to which the hollow valve stem is accurately guided by the parts which it engages above and below the end of the sleeve, so that the valve member enters its seat in the sleeve smoothly as it moves upwardly after the relief valve has been depressed to bring about flushing operation.

While I regard the flexible flanged washer 33 (or 33ª in the modified form of relief valve just described) as particularly efficient and constituting a highly valuable feature of my invention, yet any other form of valve on the operating stem controlling communication through the relief valve chamber, as an ordinary disk valve, might be employed, and I do not intend the appended claims to be limited to the specific construction described, except as they may be limited thereto by their terms.

Inasmuch as the bearing of the base 26 of the push button on the stem of the relief valve assembly at the extreme top of the casing is spaced a substantial distance above the bearing of the stem in the portion of the sleeve forming the relief valve chamber, the stem is constrained to a true vertical movement, and the lower end of the hollow stem, through the sliding engagement of the upwardly flanged washer member 35 with the interior of the connecting stem 9 of the connected main valve and piston members, serves as a guide for such connected members.

It will be understood that when the valve is in service, the full service pressure will normally extend from the inlet pipe, through the annular screen chamber above the main valve seat and the by-pass provided by the adjustable plug 17 into the cylinder space constituting the pressure chamber above the piston 7, and both the main valve and relief valve will be held seated by the full pressure of the connected water system. When, under such conditions, the relief valve assembly is depressed by operation of the push button, the pressure above the piston will be relieved as heretofore explained and the upwardly acting pressure exerted on the portions of the connected piston and main valve surrounding the main valve seat will lift the connected parts against the force of gravity, and thereby open the main valve to initiate a flush of water to the closet bowl. The push button now being released, the spring 27 will lift the relief valve assembly and valve members 33—35 to upper position, thus cutting off communication between the pressure chamber above the piston and the outlet side of the device, and the piston and connected parts will descend by gravity while water under pressure will pass from the main valve chamber upwardly through the screen 14 and by-pass opening 18—19 into the pressure chamber, permitting the connected piston and main valve to move downwardly only as fast as permitted by the throttled flow of water through the by-pass, until the main valve reaches its seat and the normal pressure conditions first mentioned are restored.

During this descending movement of the piston, the pressure on opposite sides of the washer 11 will be nearly but not quite balanced, and the piston and connected parts will in effect settle by gravity to closed position opposed in addition to the water pressure, only by the frictional retardation or drag of the skirt of the washer upon the piston, the slight preponderance of pressure below the piston being such as to maintain the skirt of the washer in sealed contact with the piston. It will be noted that this frictional drag of the descending piston on the skirt of the washer is in a direction to drag it downwardly from its line of clamped engagement between the casing members and that the skirt is free to yield downwardly and outwardly to such frictional downward pull (except as opposed by the slight water pressure below) so that the piston slips and drags easily through the skirt in its downward movement. By this specific construction, I avoid the inherent defects of a cup-leather washer secured to the piston or plunger, such as is frequently employed in flushing valves of this general type, in which usual construction the frictional drag of the skirt of the cup-leather (supplemented by the water pressure) tends to crowd the skirt along the cylinder wall and into the space at the angle between the skirt and body portion, the result of this action being that, if pressure conditions are such as to raise the piston and main valve to balanced position, the piston will stick there and not descend, due to the fact that the frictional retardation of the skirt of the cup leather is greater upon downward movement of the piston than upon upward movement.

It will be observed that neither of the two flexible leather washers 33 and 35 which make up the relief valve and are respectively mounted to slide in the two sleeves 9 and 22, leaves the sleeve which serves as a seat for it. The water never passes the washer 35, and since in passing the port 36 the skirt of the washer 33 is under equal pressure on both sides there is no tendency for any inside pressure to force the skirt outwardly into the port and thereby cause damage or interfere with the functioning of the device. The position of the valve may be changed angularly through rotation during movement without the possibility of the most minute leak occurring therefrom, and the valve is entirely free from the defects due to imperfect seating of disk relief valves of the usual type above referred to, because of angular change of position, or sediment, or deposits, or small hard particles in the water which interfere with perfect seating of the valve and give rise to leaks causing continuous flow of water through the valve, as heretofore explained. It may be noted further that the construction is such that the washers of the relief valve assembly can enter the sleeves in which they operate only in the right way, and that when assembled their skirts cannot be reversed or turned backward from any cause.

I claim:

1. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a relief valve assembly including a hollow stem closed at the top having its lower portion arranged to make sliding sealed engagement with the bore in said connecting sleeve and equipped above with a flexible flanged valve member sildingly arranged in said relief valve chamber, the wall of said valve chamber and said hollow stem of the relief valve assembly being provided with ports, and said flanged valve member being arranged to close communication between said ports in a normal closed position of the valve and to open communication through said ports when shifted to opposite open position, and means for actuating said valve stem.

2. A flushing valve comprising a casing having inlet and outlet flow passages and a main valve seat therebetween and a cylindrical pressure chamber, said casing being formed also with a relief valve chamber, a main valve cooperating with said main valve seat, a piston in said pressure chamber connected to said main valve, a relief valve assembly including a hollow stem closed at the top and open to said outlet flow passage below and a flexible flanged valve member on said stem slidingly arranged in said relief valve chamber, the wall of said valve chamber and said hollow stem of the relief valve assembly being provided with ports and said flanged valve member being arranged to close communication between said ports in a normal closed position of the valve and to open communication through said ports when shifted to opposite open position, and means for actuating said valve stem.

3. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a relief valve assembly including a manually depressible upwardly spring-pressed hollow stem closed at the top and open to said outlet flow passage below, a flexible upwardly flanged valve member adjacent the lower end of said stem slidingly arranged within said connecting sleeve, and a second flexible downwardly flanged valve member arranged above said first mentioned flanged valve member within said relief valve chamber, the wall of said relief valve chamber and said hollow stem of the relief valve assembly being provided with ports, and said downwardly flanged valve member being arranged to close communication between said ports in upper position of the valve and to open communication through said ports when shifted to lower position.

4. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a depressible spring-pressed hollow piston stem slidingly engaging adjacent its top a seat in the casing wall and slidingly engaging inside the casing said connecting sleeve of the main valve and piston, the upper portion of said hollow stem communicating with the relief valve chamber and the lower end being open to said outlet flow passage below the main valve, and a relief valve on said stem governing communication between said pressure chamber and said relief valve chamber.

5. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a depressible spring-pressed hollow piston stem slidingly engaging adjacent its top a seat in the casing wall and slidingly engaging inside the casing said connecting sleeve of the main valve and piston, the upper portion of said hollow stem communicating with the relief valve chamber and the lower end being open to said outlet flow passage below the main valve, and a relief valve on said stem arranged to open and close the lower end of said sleeve forming the relief valve chamber.

6. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a depressible spring-pressed hollow piston stem slidingly engaging adjacent its top a seat in the casing wall and slidingly engaging inside the casing said connecting sleeve of the main valve and piston, the upper portion of said hollow stem communicating with the relief valve chamber and the lower end being open to said outlet flow passage below the main valve, and a flexible downwardly flanged relief valve in said stem arranged to seat inside said sleeve forming the relief valve chamber in normal upper position of the valve and arranged to clear the lower end of said sleeve when depressed to lowermost position.

7. A flushing valve comprising a casing having inlet and outlet flow passages and a main valve seat therebetween and a cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a relief valve assembly including a hollow stem closed at the top having its lower portion arranged to make sliding sealed engagement with the bore in said connecting sleeve and equipped above with a flexible flanged valve member arranged to slidingly engage said relief valve chamber, the wall of said hollow stem being formed with a port above said valve member and said valve member being arranged to close communication through said port in a normal closed position of such member and to open communication through such port when shifted to opposite open position.

8. A flushing valve comprising a casing having inlet and outlet flow passages and a main valve seat therebetween and cylindrical pressure chamber and a sleeve forming a relief valve chamber extending axially into said pressure chamber, a main valve cooperating with said main valve seat, a piston in said pressure chamber, said valve and piston being connected and provided with an axial connecting sleeve, a relief valve assembly including a manually depressible upwardly spring-pressed hollow stem closed at the top and open to said outlet flow passage below, a flexible upwardly flanged valve member adjacent the lower end of said stem slidingly arranged within said connecting sleeve, and a second flexible downwardly flanged valve member above said first mentioned flanged valve member arranged to slidingly engage said relief valve chamber, the wall of said hollow stem being formed with a port above said second mentioned flanged member and such second mentioned member being arranged to close communication between said ports in upper position of the valve and to open communication through said ports when shifted to lower position.

9. In a flushing valve of the character described and having casing members formed with a main valve seat and a pressure chamber and having a connected piston and main valve in said casing normally held to closed position by pressure in said chamber, said casing also including a relief valve chamber open at its lower and to pressure within said pressure chamber and having a lateral port, a relief valve assembly including a packed upwardly spring-pressed hollow stem extending upwardly through the casing, said stem being closed above and open to the discharge passage of the valve below and being arranged to be manually actuated, a flexible downwardly flanged valve member in said relief valve chamber, said hollow stem being formed with a lateral opening above said valve member and said valve member being arranged to place said pressure chamber and hollow stem in communication when depressed, and packing means on the lower end of said hollow stem for sealing communication around said stem between said retarding chamber and said discharge passage of the valve.

10. A flushing valve according to claim 9 in which the recited packing means on the lower end of the hollow stem of the relief valve assembly consists of a flexible upwardly flanged member.

11. A flushing valve structure according to claim 3 in which said hollow relief valve stem extends upwardly through the casing and has a sliding bearing therein at the extreme top of the casing and also at a point within the casing in the sleeve enclosing the relief valve chamber, whereby the lower end of said hollow stem serves as a guide member for said connected main valve and piston members.

12. In a flushing valve of the character described and including a main valve and a relief valve, casing members chambered to form a cylindrical pressure chamber and including a body member and a cap member having screw threaded connection, the inner face of said cap member being of less diameter than the inner face of said body member adjacent the joint between such members, a cup-shaped piston secured to said main valve and working in said chamber, and a flexible washer clamped between said casing members and having its inner edge stretched in a downwardly extending flange hugging the piston closely adjacent the circular offset between said casing members, whereby the washer flange is free to yield downwardly and outwardly under the frictional drag of the piston in its downward movement.

13. In a flushing valve of the character described and including a main valve and a relief valve, casing members chambered to form a cylindrical pressure chamber and including a body member and a cap member having screw threaded connection, said body member being chamfered at its upper end, a cup-shaped piston secured to said main valve and working in said chamber, and a flexible washer clamped between said casing members and having its inner edge stretched in a downwardly extending flange hugging the piston closely in the space formed by the chamfer of the body member, whereby the washer flange is free to yield downwardly and outwardly under the frictional drag of the piston in its downward movement.

14. In an automatic flushing valve of the type described and having a casing chambered to form a cylindrical pressure chamber and a loose fitting cup-shaped piston arranged to reciprocate axially in said chamber and also having a relief valve and a main valve connected to said piston, a flexible washer having an annular radially extending section secured adjacent its outer edge to said cylinder wall and having a downwardly extending cylindrical skirt section slidably engaging said piston, the cylinder wall adjacent said skirt section being spaced away therefrom, whereby the washer flange is free to yield downwardly and outwardly under the frictional drag of the piston in its downward movement.

15. In an automatic flushing valve of the type described and having a casing chambered to form a cylindrical pressure chamber and a loose fitting cup-shaped piston arranged to reciprocate axially in said chamber and also having a relief valve and a main valve conected to said piston, a flexible washer having an annular radially extending section secured adjacent its outer edge to said cylinder wall and having a downwardly extending cylindrical skirt section slidably engaging said piston, the cylinder wall above said annular radially extending section being formed with a corresponding annular face inside the point of attachment of said section to the cylinder and the cylinder wall adjacent said skirt section being cut away opposite the radially extending annular face of the cylyinder wall above said washer, whereby the washer flange is free to yield downwardly and outwardly under the frictional drag of the piston in its downward movement.

ROBERT A. BROOKS.